United States Patent [19]

Kodaira

[11] Patent Number: 4,761,745

[45] Date of Patent: Aug. 2, 1988

[54] OFF-LINE PROGRAMMING FOR A ROBOT WITH DIVISION OF THE WORK SEQUENCE INTO PLURAL JOBS

[75] Inventor: Norio Kodaira, Hyogo, Japan

[73] Assignee: Mitsubishi Denki Kabushiki Kaisha, Tokyo, Japan

[21] Appl. No.: 928,080

[22] Filed: Nov. 7, 1986

[30] Foreign Application Priority Data

Nov. 7, 1985 [JP] Japan .................................. 60-247919

[51] Int. Cl.$^4$ ............................................ G05B 13/00
[52] U.S. Cl. .......................................... 364/513; 901/3; 318/568; 364/192
[58] Field of Search ............... 364/191, 192, 193, 167, 364/513; 318/568; 901/3, 4, 5

[56] References Cited

U.S. PATENT DOCUMENTS

| | | | |
|---|---|---|---|
| 4,408,286 | 10/1983 | Kikuchi et al. ..................... | 364/513 |
| 4,456,961 | 6/1984 | Price et al. .......................... | 364/513 |
| 4,495,588 | 1/1985 | Nio et al. ............................ | 364/513 |
| 4,590,578 | 5/1986 | Barto, Jr. et al. .................... | 364/167 |
| 4,604,716 | 8/1986 | Kato et al. .......................... | 364/513 |
| 4,613,943 | 9/1986 | Miyake et al. ....................... | 364/513 |
| 4,683,544 | 7/1987 | Hariki ................................. | 364/191 |

OTHER PUBLICATIONS

Graphic Simulation for Off-Line Robot Programming; Howie; *Robotics Today*, pp. 63–66; Feb. 1984.

*Primary Examiner*—Jerry Smith
*Assistant Examiner*—Allen MacDonald
*Attorney, Agent, or Firm*—Sughrue, Mion, Zinn, Macpeak & Seas

[57] ABSTRACT

An off-line programming method and apparatus for a robot comprising creating a work program for a work sequence in terms of the workpiece coordinates, breaking up the sequence into plural jobs comprising closely associated segments, converting the segments into the coordinates of the robot, teaching the robot two points per job, determining the differences (error vectors) between the converted segments and the two taught points, and apportioning the error vectors to the remaining points.

10 Claims, 4 Drawing Sheets

OFF-LINE PROGRAMMING FOR A ROBOT WITH DIVISION OF THE WORK SEQUENCE INTO PLURAL JOBS

BACKGROUND OF THE INVENTION

This invention relates to an off-line programming method for robots. More particularly, it relates to a process for adapting to individual robots their work point positions which are stated in work programs arranged without using the robots installed in an actual production line so as to provide instructions for robots to make them perform specified activities.

To make a plurality of robots installed in a production line perform a given work sequence work process, teaching has heretofore been adopted. The work process teaching is conducted in such a manner that, while a production line is stopped, the operator actually operates the robot in accordance with a working order sequence, which is then compiled into a work program. Off-line programming, in place of such work process teaching, is being increasingly introduced in order to reduce the work process teaching load and shorten the downtime of the production line. By off-line programming is meant that work programs, which robots are made to execute, are arranged without actually operating the robots.

FIGS. 7A and 7B are diagrams illustrating a method for arranging a work program through such off-line programming. FIG. 7A shows the off-line method for producing a work program and FIG. 7B shows the method for preparing a work program based on a provisional work program. In FIGS. 7A and 7B, there is shown an arrangement of a production robot 1, a workpiece 2, a programming device 3 provided with robot language editing and robot operation simulating functions, and, in FIG. 7B there is shown another teaching robot 4 installed outside a production line.

It has been so arranged that the off-line work program of FIG. 7A is prepared by the programming device 3 from data it receives on the three-dimensional geometries of the robot 1 and the workpiece 2. In this case, the work point positions of the robot 1 are stated in the work program produced through off-line programming, the positions thereof being set in conformity with a descriptive predetermined coordinate system. The work point positions must consequently be converted into work point positions corresponding to the coordinate system with the robot 1 as a reference unit. The conversion of the work point positions is carried out by inputting numerical values based on the relationship of the robot 1 in a measured work cell to the workpiece 2 in terms of their arrangement or the relationship of the robot 1 in the work cell stated in a drawing and the like to the workpiece 2 in the same terms.

The work program according to the provisional work program of FIG. 7B is prepared in such a manner that work process teaching is performed in order to prepare the provisional work program by using the teaching robot 4. The provisional work program is converted by the programming device 3 into the work program adaptable to the production robot 1. Since the work point positions are set in conformity with a coordinate system of the teaching robot 4 installed outside the production line as a reference unit, they must be converted into the work point positions corresponding to the coordinate system with the production robot 1 as a reference unit. The conversion of the work point positions is carried out by teaching several representative work points at which each robot 1 within the production line works on the same workpiece 2 to obtain coordinate conversion relationships and converting the work point positions stated in the provisional program into those corresponding to the coordinate system with each robot 1 within the production line as a reference unit in terms of coordinates.

However, the actual robot 1 may make errors which cannot be accepted as negligible, including errors in the mechanism of the robot 1, errors inherent in each robot 1 because of deviation from the origin of coordinates with the robot 1 as a reference unit, and local errors arising depending on the working posture of the robot 1 when the front ends of the arms thereof are loaded with a heavy object. Those errors cannot be dealt with by means of mechanical coordinate conversion however accurately the actual measurement or work process teaching is performed.

For the above reasons, the portions where conversion accuracy have not yet been attained must be subjected to work process teaching again even though the work point positions stated in the work program are converted into those corresponding to the coordinate system with each robot 1 as a reference unit. In consequence, the problem is that it is still impossible to reduce a work process teaching load and shorten downtime in the production line.

SUMMARY OF THE INVENTION

The present invention is intended to solve the above problems, and it is therefore an object of the invention to provide an off-line programming method for robots with the view of reducing a work process teaching load and shortening downtime in a production line.

The off-line programming method for robots according to the present invention comprises the steps of: (1) preparing a work program based on the three-dimensional geometries of a robot and a workpiece, (2) converting the work point positions of the robot, determined in conformity with a coordinate system with the workpiece stated in the work problem as a reference unit, into work point positions corresponding to a coordinate system with the robot as a reference unit in terms of coordinates, (3) dividing the work point positions stated in the work program, which positions have been converted in terms of coordinates depending on the contents of the work of the robot, to provide a plurality of jobs, (4) teaching the robot over a least two work points per job, and (5) apportioning and adding an error vector in regard to each work point thus converted in terms of coordinates with what is obtained through teaching in proportion to the work point positions within the job so that an error arising locally depending on the work position and posture of the robot can be corrected.

DESCRIPTION OF THE PREFERRED EMBODIMENTS

Referring to the accompanying drawings, an embodiment of the present invention will be described in detail.

Figure 1:
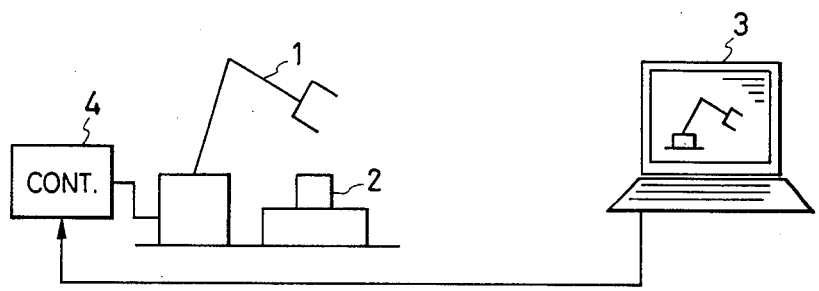
FIG. 1 is a schematic diagram of a programming device to which an off-line programming method for robots embodying the present invention has been applied.

FIG. 1 is a schematic diagram of a programming device to which an off-line programming method for robots according to the present invention has been applied. In FIG. 1, there is shown an arrangement of a robot 1, a workpiece 2 and a programming device 3.

Based on data of the three-dimensional geometries of the robot 1 and the workpiece 2, the programming device 3 is capable of so functioning as to produce a work program in which work point positions are determined in conformity with a coordinate system with the workpiece 2 as a reference unit and to convert the work point positions stated in the work program into work point positions corresponding to a coordinate system with the robot 1, rather than the workpiece 2, as a reference unit. This work program is produced through the method of teaching representative work points using the workpiece 1. The robot 1 is also equipped with a robot controller 4 for correcting the work points thus converted into the coordinate system with the robot 1 as a reference unit.

Figure 2:
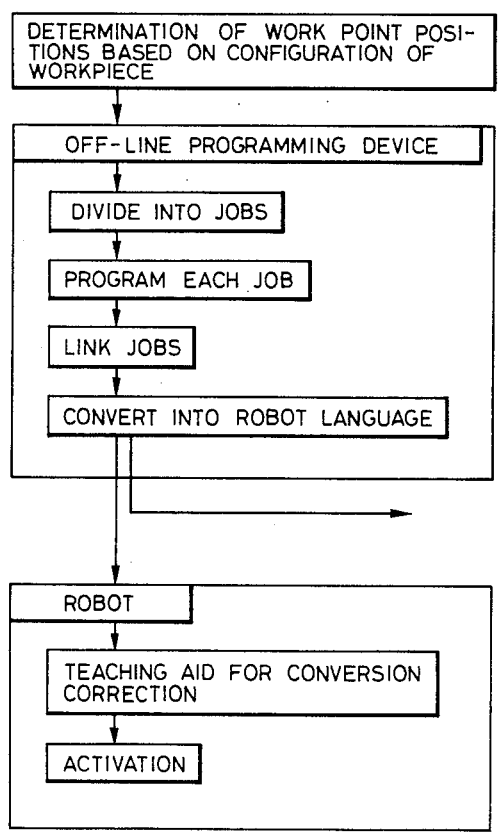
FIG. 2 is an illustration of the function of the programming device and a robot controller for converting work points in terms of coordinates and correcting local error in the work points.

FIG. 2 is an illustration of the function of the programming device 3 and the robot controller for converting the work points in terms of coordinates and correcting local errors in the work points. The programming device 3 first determines the work points based on the three-dimensional model of the workpiece 2, divides all the work points into groups and provides a job with the plurality of work points thus divided as a unit. After programming the operating path and work posture of the robot 1 on a robot basis, the programming device 3 links several jobs and produces a work program for one unit of robot operation. The programming device 3 further converts the work program thus prepared into a robot language and supplies each robot with it. The coordinate conversion and the teaching aid program for local corrections as will be described later are automatically incorporated in that program.

Figure 3:
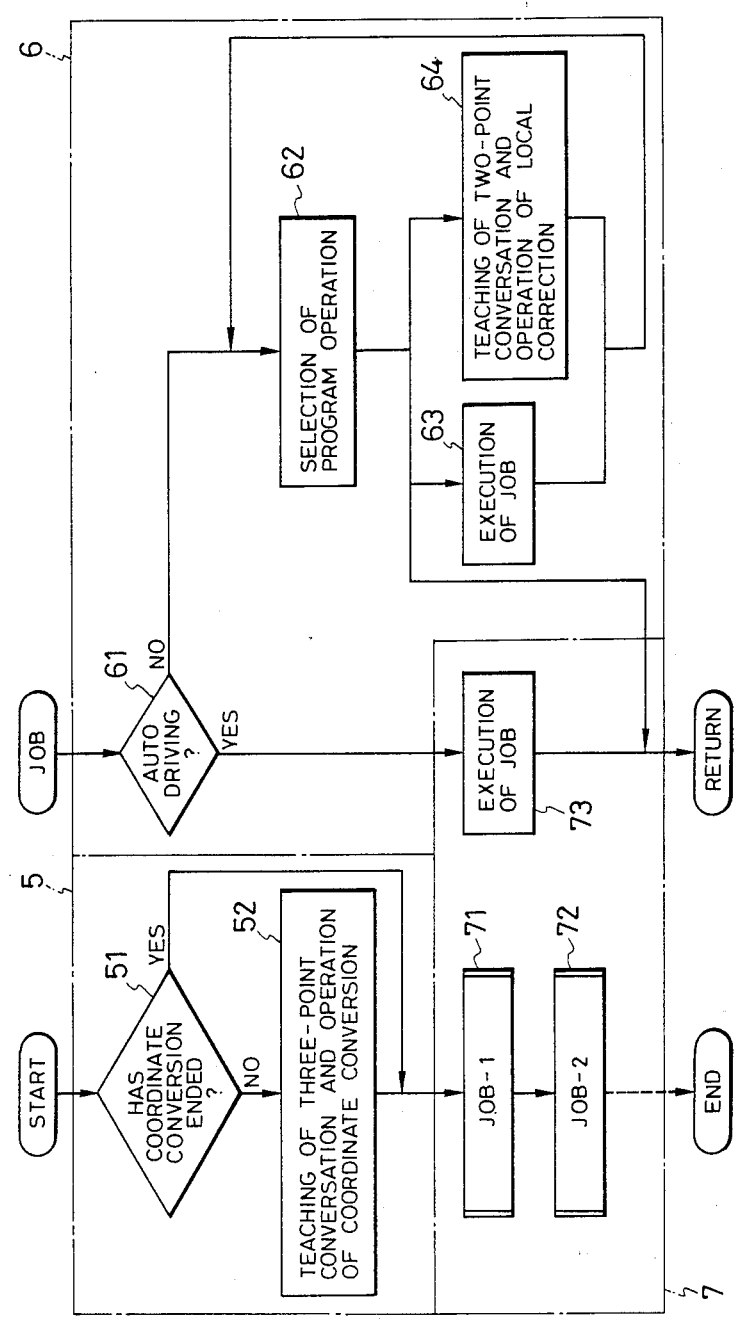
FIG. 3 is an illustration of an program incorporating a teaching aid program.

FIG. 3 is an illustration of the work program with the teaching aid programs incorporated therein. The teaching programs 5 and 6 shown in FIG. 3 carry out not only teaching for coordinate conversion and local correction, but also processing, whereas the work program 7 is intended to move the robot 1. When the work program is started by the robot controller 4, the teaching aid program 5 operates if coordinate conversion is required (Step 51) and coordinate conversion at all the work points is carried out (Step 52) when the teaching operator positions the robots 1 successively at three points as instructed on the display of the robot controller. As the result of the coordinate conversion, a local error may exist in each job and, when the error is corrected, the teaching aid program 6 is called by selection of program operation. If the teaching operator teaches two work points according to the instructions on the display (Step 64), predetermined processing is carried out to obtain desired positioning accuracy relative to the job.

Figure 4:
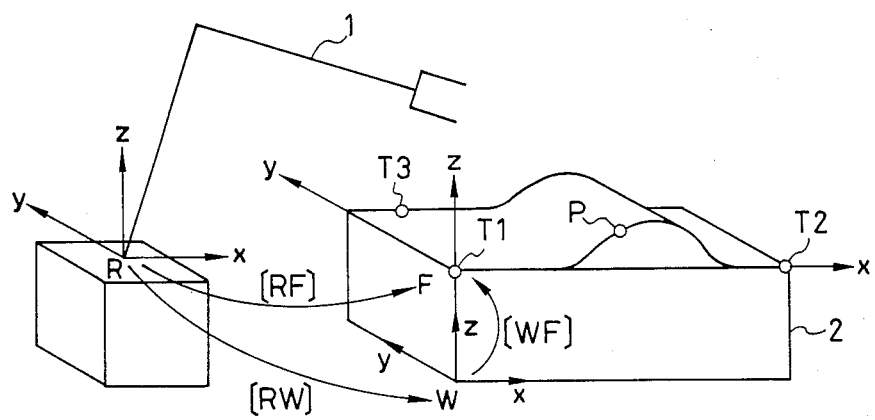
FIG. 4 is an illustration of calculations of coordinate conversions based on teaching of work point positions.

FIG. 4 is an illustration of calculations of the coordinate conversion based on teaching representative work point positions. In FIG. 4, a coordinate system F is the one determined by work points T1, T2 and T3 for teaching. Namely, the point T1 is the origin. A straight line passing through the point T1 and T2 is the x axis. A plane including the points T1, T2 and T3 is the plane x-y. When the program is inputted to the robot 1 initially, the work point P and the points T1-T3 are stated on the basis of a coordinate system W with the workpiece 2 as a reference unit. Consequently, a conversion transformation matrix [WF] from the coordinate system F to the coordinate system W is first calculated. On the other hand, by teaching the robot 1 the points T1-T3, the points T1-T3 can be stated in conformity with a coordinate system R with the robot 1 as a reference unit and, like the calculation of the coordinate conversion matrix [WF], a conversion matrix [RF] transformation from the coordinate system F to the coordinate system R is calculated. Accordingly, a conversion matrix [RW] from the coordinate system W with the workpiece 2 as a reference unit to the coordinate system R with the robot 1 as reference unit is obtained from the calculation of:

$$[FW] = [RF][WF]^{-1},$$

where $[WF]^{-1}$ is the inverse matrix of [WF]. Then, the work point P is converted into the coordinate system with the robot 1 as the reference unit in terms of coordinates using the above equation. The conversion of the work point positions may be carried out by inputting numerical values using the programming device 3 as described above.

Figure 5:
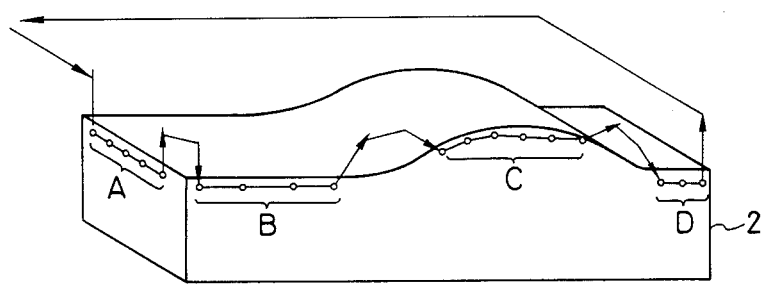
FIGS. 5 and 6 are illustrations of corrections of local errors in work points with teaching of two work points.
Figure 6:
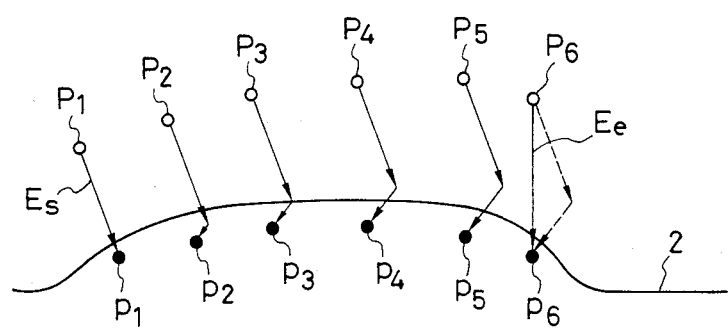
Figure 7A:
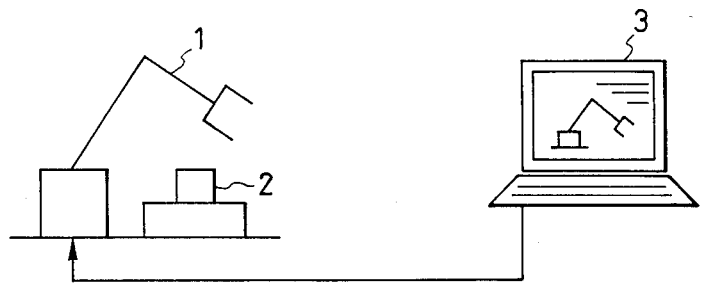
FIGS. 7A and 7B are illustrations of a method for preparing a work program through conventional off-line programming.
Figure 7B:
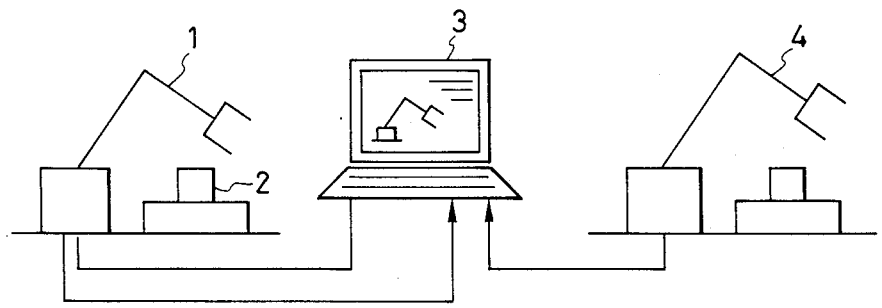

FIGS. 5 and 6 are illustrations of corrections of local errors in work points involved through teaching two work points. FIG. 5 is a schematic diagram of spot welding performed by the robot 1, whereas FIG. 6 is an illustration of the correction of spot welding work points. Spot welding is conducted by continuously welding sections A, B, C and D, each having several to several tens of welding spots. The correction of the local error in the work point is made on a welding section basis, i.e., one job is treated as a unit. In FIG. 6, $P_1$-$P_6$ designate the work points in vector form obtained from the above coordinate conversion on a work point basis and $p_1$-$p_6$ represent work points on the actual workpiece 2, also in vector form, which are obtained by correcting the work points $P_1$-$P_6$. By first teaching the robot 1 the work point $p_1$ as the original work point of the work point $P_1$ and teaching the work point $p_6$ as the original work point of the work point $P_6$ first, $$p_i = P_i + E_s + (i-s)(E_e - E_i)/(e-s) \tag{1}$$

is calculated to obtain the original work point $p_2$-$p_5$ while error vectors $E_s$ and $E_e$ are determined and added in proportion to the locations of the work points $P_2$-$P_5$, respectively. In reference to FIG. 6, i=2-5, s=1, e=6, $E_s = p_1 - P_1$, and $E_e = p_6 - P_6$. To minimize the number of work points for teaching in this embodiment, other work points are to be corrected by teaching only two work points per job, whereby it is necessary to take such a few things into consideration that the points within the job should not be much scattered and that the work posture of the robot 1 within the job should not be altered to a large extent.

As set forth above, since the off-line programming method for robots according to the present invention is so arranged as to comprise preparing a work program based on the three-dimensional geometries of a robot and a workpiece, converting the work point positions of the robot determined in conformity with a coordinate system with the workpiece stated in the work program as a reference unit into work point positions corresponding to a coordinate system with the robot as a reference unit in terms of coordinates, dividing the work point positions stated in the work program and thus converted in terms of coordinates depending on the contents of the work of the robot to provide a plurality of jobs, and teaching the robot at least over two work points per job, apportioning and adding an error vector in regard to each work point thus converted in terms of coordinates with what is obtained through teaching in proportion to the work point positions within the job so that a local error locally depending on the work position and posture of the robot can be corrected. The work program produced through the off-line programming is adaptable in a highly accurate fashion to the individual robots installed on the production line with the least work process teaching. In consequence, it is possible to reduce a work process teaching load and shorten downtime for work process teaching in the production line by a large margin.

Moreover, errors in the work points of the robot can be corrected without modifying the work program.

What is claimed is:

1. A method of off-line programming a robot, said robot having a first three dimensional geometry that may serve as a first coordinate system, for preparing a work program that said robot is made to execute without being required to move while working on a workpiece, said workpiece having a second three dimensional geometry that may serve as a reference for a second coordinate system, comprising the steps of:
    preparing a work program based on the first and second three-dimensional geometries of said robot and said workpiece, respectively;
    converting work point positions of said robot, specified in accordance with said second coordinate system that has said workpiece stated in the work program as a reference unit, into work point positions that are specified in accordance with said first coordinate system that has said robot as a reference unit;
    dividing the work point positions stated in the work program that have been specified in terms of said first coordinate system as a function of the work to be performed by the robot in order to provide a plurality of jobs;
    teaching said robot at least two work points per job;
    determining an error vector for said at least two work points per job, based upon a comparison of said work points as specified in terms of said first coordinate system and in terms of comparable points on the actual workpiece;
    apportioning an error vector to each said work point that has been specified in terms of said first coordinate system in proportion to all the work point positions within the job; and
    adding said apportioned error vector to each said work point to thereby correct a local error depending on the work position and posture of said robot.

2. An off-line programming method for robots as claimed in claim 1, wherein said work point conversion, said apportioning and said adding steps are incorporated as a teaching aid program in said work program that states the contents of work for operating said robot, said method further comprising supplying said work program to said robot.

3. An off-line programming method for robots as claimed in claim 1, wherein said apportioning step performs proportional interpolating processing.

4. An off-line programming method for robots as claimed in claim 1, wherein said teaching step teaches said robot over only two work points.

5. An off-line programming method as claimed in claim 4, wherein each job has a beginning and an end and said two work points are at the beginning and end of each said job.

6. An off-line programming apparatus for a robot, said robot having a first three dimensional geometry that may serve as a first coordinate system, for preparing a work program that said robot is made to execute without being required to move while working on a workpiece, said workpiece having a second three dimensional geometry that may serve as a second coordinate system, comprising:
    a robot;
    means for preparing a work program based on the first and second three-dimensional geometries of said robot and said workpiece, respectively;
    means for converting work point positions of said robot, specified in accordance with said second coordinate system that has said workpiece stated in the work program as a reference unit, into work point positions that are specified in accordance with said first coordinate system that has said robot as a reference unit;
    means for dividing the work point positions stated in the work program that has been specified in terms of converted coordinates that depend on the contents of the work of the robot in order to provide a plurality of jobs;
    means for teaching said robot at least two work points per job;
    means for determining an error vector for said at least two work points per job, based upon a comparison of said work points as specified in terms of said first coordinate system and in terms of comparable points on the actual workpiece;
    means for apportioning an error vector to each said work point that has been specified in terms of said first coordinate system in proportion to all the work point positions within the job; and
    means for adding said apportioned error vector to each said work point to thereby correct a local error depending on the work position and posture of said robot.

7. An off-line programming apparatus for robots as claimed in claim 6, wherein said work point conversion, said apportioning and said adding means depend on a teaching aid program in said work program that states the contents of work for operating said robot, said apparatus further comprising means for supplying said work program to said robot.

8. An off-line programming apparatus for robots as claimed in claim 6, wherein said apportioning means performs proportional interpolating processing.

9. An off-line programming apparatus for robots as claimed in claim 6, wherein said teaching means teaches said robot over only two work points.

10. An off-line programming apparatus as claimed in claim 9, wherein each job has a beginning and an end and said two work points are at the beginning and end of each said job.

* * * * *